United States Patent
Shen et al.

(10) Patent No.: US 10,389,615 B2
(45) Date of Patent: Aug. 20, 2019

(54) ENHANCED PACKET FLOW MONITORING IN A NETWORK

(71) Applicants: Tony Changhong Shen, Shanghai (CN); Yu Zhang, Shanghai (CN); Alan Xiao-Rong Wang, Shanghai (CN); Aviv Prital, Even Yehuda (IL); Doron Oz, Sunnyvale, CA (US); Kathy Xia Ke, Shanghai (CN)

(72) Inventors: Tony Changhong Shen, Shanghai (CN); Yu Zhang, Shanghai (CN); Alan Xiao-Rong Wang, Shanghai (CN); Aviv Prital, Even Yehuda (IL); Doron Oz, Sunnyvale, CA (US); Kathy Xia Ke, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/753,325

(22) Filed: Jun. 29, 2015

(65) Prior Publication Data

US 2016/0380869 A1    Dec. 29, 2016

(51) Int. Cl.
| | | |
|---|---|---|
| *H04L 12/26* | (2006.01) | |
| *H04L 12/741* | (2013.01) | |
| *H04L 12/801* | (2013.01) | |
| *H04L 12/823* | (2013.01) | |

(52) U.S. Cl.
CPC .............. *H04L 43/16* (2013.01); *H04L 45/74* (2013.01); *H04L 47/29* (2013.01); *H04L 47/32* (2013.01)

(58) Field of Classification Search
CPC ......... H04L 43/10; H04L 43/50; H04L 49/15; H04L 49/25; H04L 41/5003; H04L 41/5009; H04L 43/0829; H04L 43/0852; H04L 43/087; H04L 43/16
See application file for complete search history.

(56) References Cited

U.S. PATENT DOCUMENTS

| | | | |
|---|---|---|---|
| 2003/0115321 A1 | 6/2003 | Edmision et al. | |
| 2006/0146723 A1 | 7/2006 | Navada et al. | |
| 2009/0122805 A1* | 5/2009 | Epps | ................... H04L 41/5009 370/417 |
| 2014/0029449 A1 | 1/2014 | Xu et al. | |
| 2016/0149788 A1* | 5/2016 | Zhang | ..................... H04L 43/10 709/224 |

* cited by examiner

*Primary Examiner* — Ayaz R Sheikh
*Assistant Examiner* — Debebe Asefa
(74) *Attorney, Agent, or Firm* — The Law Office of Kirk D. Williams (57) ABSTRACT

In one embodiment, enhanced packet flow monitoring is performed by packet switching devices in a network. A packet switching device is configured to monitor a flow of packets passing through the packet switching device, including detecting a gap in consecutive packets of the flow of packets, and attributing the gap as not being dropped one or more packets based on a particular time duration between a last received packet of the flow of packets before said detected gap and a first received packet of the flow of packets after said detected gap. In one embodiment, the gap is attributed to not being dropped packets when the particular time duration is greater than a threshold value; and conversely, attributed to being dropped packets when the particular time duration is less than a same or different threshold value.

9 Claims, 6 Drawing Sheets

ENHANCED PACKET FLOW MONITORING IN A NETWORK

TECHNICAL FIELD

The present disclosure relates generally to processing packets in a communications network including packet switching devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with enhanced packet flow monitoring in a network, such as, but not limited to a network using policy-based routing of packets. In one embodiment, a packet switching device is configured to monitor a flow of packets passing through the packet switching device, including detecting a gap in consecutive packets of the flow of packets, and attributing the gap as not being dropped one or more packets based on a particular time duration between a last received packet of the flow of packets before said detected gap and a first received packet of the flow of packets after said detected gap. In one embodiment, said monitoring includes resetting monitoring metrics for the flow of packets in response to said attributing the gap as not being dropped one or more packets.

In one embodiment, a source packet switching device sends a first plurality of packets of a flow of packets through a network including through a first packet switching device in the network. The first packet switching device monitors the flow of packets, such as, but not limited to, using passive monitors. The source packet switching device, subsequent to said sending the first plurality of packets, sends a second plurality of packets of the flow of packets through the network but not through the first packet switching device. The source packet switching device, subsequent to said sending of the second plurality of packets, sends a third plurality of packets of the flow of packets through the network including through the first packet switching device. The monitoring operation includes detecting a gap in consecutive packets of the flow of packets, and attributing the gap as not being dropped one or more packets based on a particular time duration between receiving a packet of first plurality of packets and receiving a packet of third plurality of packets.

In one embodiment, attributing the gap as not being dropped one or more packets based on the particular time duration includes comparing the particular time duration to a threshold time duration. In one embodiment, the source packet switching device is configured to delay switching from said sending of the second plurality of packets to sending the third plurality of packets to cause packets of the flow of packets to be received with the particular time duration being greater than the threshold time duration. In one embodiment, monitoring includes resetting monitoring metrics for the flow of packets in response to the particular time duration between receiving a packet of first plurality of packets and receiving a packet of third plurality of packets. In one embodiment, resetting monitoring metrics for the flow of packets in response to the particular time duration includes comparing the particular time duration to the threshold time duration.

2. Description

Disclosed are, inter alia, methods, apparatus, computer-storage media, mechanisms, and means associated with enhanced packet flow monitoring in a network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processor may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The term "route" is used to refer to a fully or partially expanded prefix (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

As used herein, a "gap" in a flow of packets refers to an interruption in the continuity, such as, but not limited to one or more packets expected to have been received by a packet switching device between two other packets of the flow of packets, and/or a gap in time between receiving two packets of the flow of packets.

In one embodiment, enhanced packet flow monitoring is performed by packet switching devices in a network. A packet switching device is configured to monitor a flow of packets passing through the packet switching device, including detecting a gap in consecutive packets of the flow of packets, and attributing the gap as not being dropped one or more packets based on a particular time duration between a last received packet of the flow of packets before said detected gap and a first received packet of the flow of packets after said detected gap. In one embodiment, the gap is attributed to not being dropped packets when the particular time duration is greater than a threshold value; and conversely, attributed to being dropped packets when the particular time duration is less than a same or different threshold value.

One embodiment includes a method, comprising: sending, by a source packet switching device, a first plurality of packets of a flow of packets through a network including through a first packet switching device in the network; monitoring, by the first packet switching device, the flow of packets; sending, by the source packet switching device and subsequent to said sending the first plurality of packets, a second plurality of packets of the flow of packets through the network but not through the first packet switching device; and sending, by the source packet switching device and subsequent to said sending the second plurality of packets, a third plurality of packets of the flow of packets through the network including through the first packet switching device; wherein said monitoring operation includes detecting a gap in consecutive packets of the flow of packets, and attributing the gap as not being dropped one or more packets based on a particular time duration between receiving a packet of first plurality of packets and receiving a packet of third plurality of packets.

In one embodiment, said attributing the gap as not being dropped one or more packets based on the particular time duration includes comparing the particular time duration to a threshold time duration. In one embodiment, the source packet switching device is configured to delay switching from said sending of the second plurality of packet to said sending of the third plurality of packets until at least the threshold time duration after said sending the first plurality of packets in signaling to the first packet switching device that the path taken by packets of the flow of packets was temporarily changed to a different path through the network. In one embodiment, the source packet switching device is configured to prevent switching from said sending the second plurality of packets to said sending the third plurality of packets until at least the threshold time duration after said sending the first plurality of packets when a path through the network corresponding to said sending of the second plurality of packets remains available. In one embodiment, the source packet switching device is configured to delay switching from said sending the second plurality of packets to said sending the third plurality of packets to cause packets of the flow of packets to be received with the particular time duration being greater than the threshold time duration. In one embodiment, said monitoring includes detecting a second gap in consecutive packets of the flow of packets and attributing the gap as being dropped one or more packets based on a second particular time duration between a last received packet before the second gap of the flow of packets and a first received packet after the second gap in the flow of packets being less than the threshold time duration.

In one embodiment, the gap in consecutive packets is determined by missing sequence numbers in consecutive packets of the flow of packets received by the first packet switching device. In one embodiment, switching from said sending the first plurality of packets to said sending the second plurality of packets is performed in response to policy-based routing. One embodiment includes deep packet inspection of one or more packets in the first plurality of packets to identify a policy of said policy-based routing. In one embodiment, said monitoring includes resetting monitoring metrics for the flow of packets in response to the particular time duration between receiving a packet of first plurality of packets and receiving a packet of third plurality of packets. In one embodiment, said resetting monitoring metrics for the flow of packets in response to the particular time duration includes comparing the particular time duration to the threshold time duration. One embodiment includes receiving, by the source packet switching device, the first plurality of packets, the second plurality of packets, and the third plurality of packets.

One embodiment includes a method, comprising: monitoring, by a first packet switching device, a flow of packets passing through the first packet switching device, including detecting a gap in consecutive packets of the flow of packets, and attributing the gap as not being dropped one or more packets based on a particular time duration between a last received packet of the flow of packets before said detected gap and a first received packet of the flow of packets after said detected gap.

In one embodiment, said attributing the gap as not being dropped one or more packets based on the particular time duration includes comparing the particular time duration to a threshold time duration. In one embodiment, said monitoring includes detecting a second gap in consecutive packets of the flow of packets and attributing the gap as being dropped one or more packets based on a second particular time duration between a last received packet before the second gap of the flow of packets and a first received packet after the second gap in the flow of packets being less than the threshold time duration. In one embodiment, the gap in consecutive packets is determined by missing sequence numbers in consecutive packets of the flow of packets received by the first packet switching device. In one embodiment, said monitoring includes resetting monitoring metrics for the flow of packets in response to the particular time duration between a last received packet of the flow of packets before said detected gap and a first received packet of the flow of packets after said detected gap. In one embodiment, said resetting monitoring metrics for the flow of packets in response to the particular time duration includes comparing the particular time duration to the threshold time duration.

One embodiment includes a packet switching device, comprising: one or more processing elements; memory; a plurality of interfaces configured to send and receive packets; and one or more packet switching mechanisms configured to packet switch packets among said interfaces. In one embodiment, the packet switching device is configured to monitor a flow of packets passing through the packet switching device, including detecting a gap in consecutive packets of the flow of packets, and attributing the gap as not being dropped one or more packets based on a particular time duration between a last received packet of the flow of packets before said detected gap and a first received packet of the flow of packets after said detected gap. In one embodiment, said monitoring includes resetting monitoring metrics for the flow of packets in response to said attributing the gap as not being dropped one or more packets.

Figure 1:
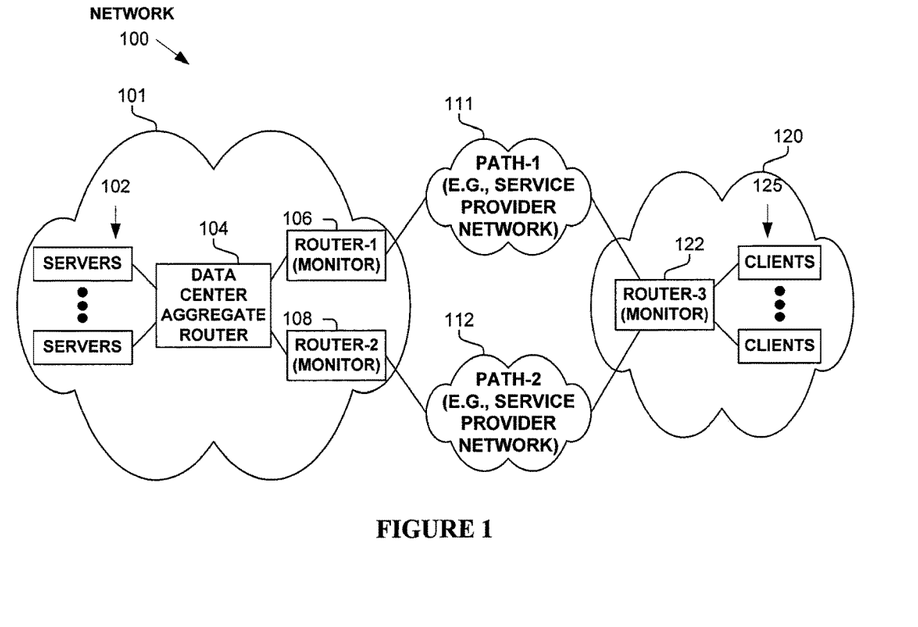
FIG. 1 illustrates a network operating according to one embodiment.

FIG. 1 illustrates a network 100 operating according to one embodiment. In the illustrated embodiment, network 100 includes a data center network 101 which includes servers 102, a data center aggregate router 104, branch routers 106 and 108 (each with packet flow monitoring capability). Network 100 also includes two different service provider network 111 and 112, and a client network 120, with branch router 122 (with packet flow monitoring capability) and clients 125. Provider networks 111 and 112 provide two distinct paths between clients 125 and servers 102. In one embodiment, these two different paths 111 and 112 are in a single provider network. In one embodiment there are more than two distinct paths between clients 125 and servers 102.

In one embodiment, routers 106, 108 and 122 include packet flow metric engine(s) for monitoring packet flows to determine real-time performance metrics such as, but not limited to, network-delay, packet/byte loss, and jitter. In one embodiment, monitoring of packet flows of at least 2000-5000 connected enterprise sites is supported.

A client 125 communicates with a server 102 via one of the two paths. Each of routers 106, 108, and 122 is configured to monitor packet flows, such as, but not limited to verifying that the network is providing a particular service level. Initially, the path taken by packets of the flow may be a default path or otherwise selected path. In one embodiment, router 122 analyzes the flow of traffic to identify a corresponding application, such as, but not limited to, by using deep packet inspection. Using policy-based routing and the identified application, router 122 redirects the flow of packets to go over a different path causing the packet traffic to go through a different router 106 or 108, or on different line cards or interfaces of a router 106 or 108. In case of degradation (e.g., brownout condition, network delay/jitter or byte loss metrics exceeding policy threshold), the path taken by the flow of packets typically changes.

In network 100, each of routers 106, 108, and 122 has one or more monitoring points for monitoring flows of traffic. When the path taken by a flow of packets changes, the flow of packets typically is monitored by a different monitoring point.

In one embodiment, a flow of packets at some time is monitored by a first monitoring point, then is monitored by another monitoring point, then returns to be monitored by a first monitoring point. In one embodiment, a flow of packets at some time is monitored by a first monitoring point, then its path is changed so it is not monitored the first monitoring point, then its path is changed so it returns to be monitored by the first monitoring point. In these circumstances (and possibly others), there will be a gap in time and often a gap in sequence numbers (when sequence numbers are used in packets) in the flow of packets from the perspective of the first monitoring point. However, in an alternate scenario packets could have been dropped (instead of forwarded over a different path) resulting in the same view of the flow of packets from the perspective of the first monitoring point.

To differentiate these two scenarios of changing network paths and dropped packets by a monitoring point (e.g., routers 106 or 108), one embodiment uses a time threshold for each flow of packets. If the duration of the gap in packets of a flow is greater than a predetermined threshold value (e.g., thirty or sixty seconds), then the gap is considered not to be caused by dropped packets. If the duration of the gap is less than a considered to be caused by dropped packets. In one embodiment, a router that can change the path of a flow of packets (e.g., router 122) does not change the path of a flow of packets to return to a previous monitoring point unless the duration of the gap of packets will be greater than the threshold used by the monitoring point to attribute the gap not to be caused by dropped packets. In this manner, router 122 signals router 106 or 108 to attribute the gap in packets not to be caused by dropped packets by enforcing a minimum time gap greater than the predetermined threshold.

In one embodiment in which packets of a flow of packets include sequence numbers, a monitoring point will require a gap in sequence numbers and the duration of the gap in time to be greater than a predetermined threshold value (e.g., thirty or sixty seconds) to attribute the gap as not to being caused by dropped packets.

Figure 2A:
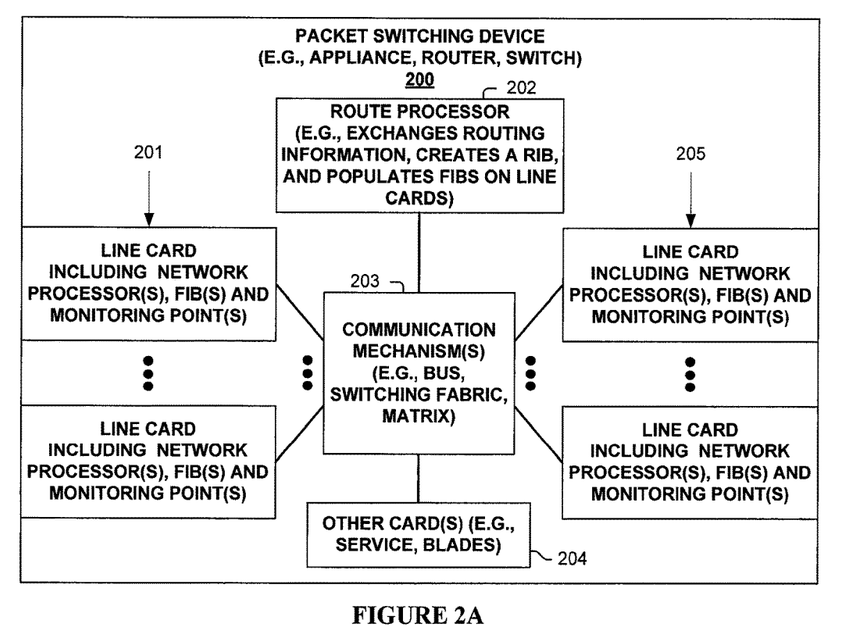
FIG. 2A illustrates a packet switching device according to one embodiment.

One embodiment of a packet switching device 200 with monitoring points on line cards and/or interfaces is illustrated in FIG. 2A. In one embodiment, a monitoring point is a flow monitoring engine including a processor or specialized hardware to monitor flows of packets. As shown, packet switching device 200 includes multiple line cards 201 and 205, each with one or more network interfaces for sending and receiving packets over communications links (e.g., possibly part of a link aggregation group), and with one or more processors that are used in one embodiment associated with enhanced packet flow monitoring in a network. Packet switching device 200 also has a control plane with one or more processors 202 for managing the control plane and/or control plane processing of packets associated with enhanced packet flow monitoring in a network. Packet switching device 200 also includes other cards 204 (e.g., service cards, blades) which include processors that are used in one embodiment to process packets with selective configuring of throttling engines for flows of packet traffic, and some communication mechanism 203 (e.g., bus, switching fabric, matrix) for allowing its different entities 201, 202, 204 and 205 to communicate.

Line cards 201 and 205 typically perform the actions of being both an ingress and egress line card, in regards to multiple other particular packets and/or packet streams being received by, or sent from, packet switching device 200. In one embodiment, line cards 201 and/or 205 use command message generation and execution using a machine code-instruction to perform prefix or other address matching on forwarding information bases (FIBs) to determine how to ingress and/or egress process packets. Even though the term FIB includes the word "forwarding," this information base typically includes other information describing how to process corresponding packets.

In one embodiment, the analysis of which interfaces can receive an identified flow of packet traffic is performed by each individual line card 201, 205, possibly singularly or for multiple network processor units, etc. In one embodiment, the analysis of which interfaces can receive an identified flow of packet traffic is performed by route processor 202.

Figure 2B:
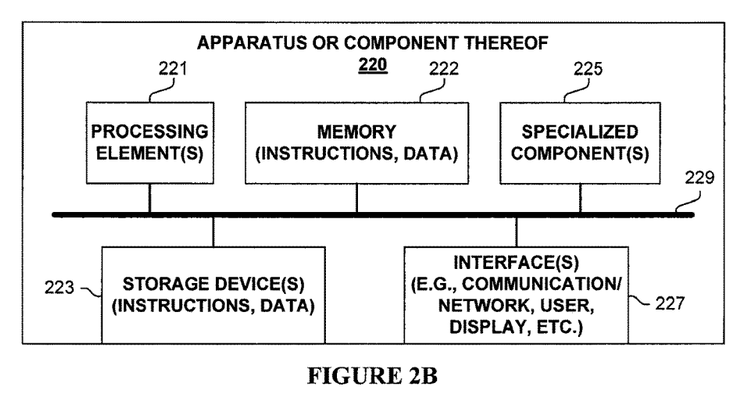
FIG. 2B illustrates an apparatus according to one embodiment.

FIG. 2B is a block diagram of an apparatus 220 used in one embodiment associated with enhanced packet flow monitoring in a network. In one embodiment, apparatus 220 performs one or more processes, or portions thereof, corresponding to one of the flow diagrams illustrated or otherwise described herein, and/or illustrated in another diagram or otherwise described herein. In one embodiment, these processes are performed in one or more threads on one or more processors.

In one embodiment, apparatus 220 includes one or more processor(s) 221 (typically with on-chip memory), memory 222, storage device(s) 223, specialized component(s) 225 (e.g., ternary content-addressable memory(ies) such as for performing flow identification packet processing operations, flow monitoring, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3:
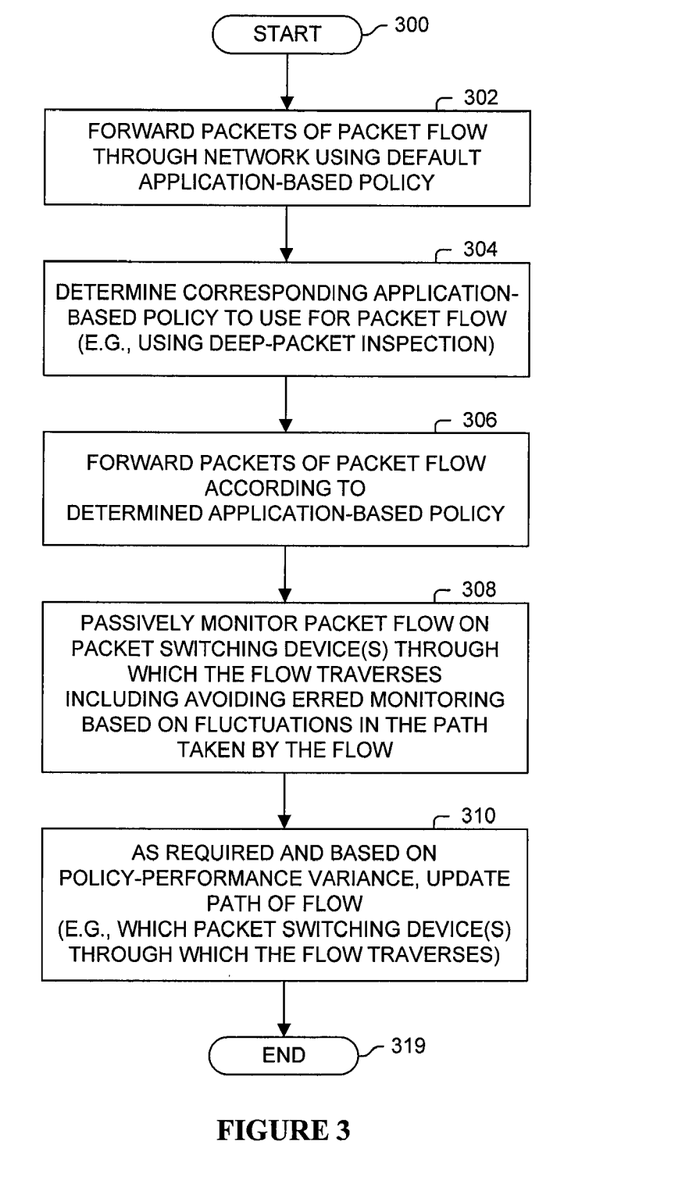
FIG. 3 illustrates a process according to one embodiment.

FIG. 3 illustrates a process performed in one embodiment. Processing commences with process block 300. In process block 302, packets of a packet flow are forwarded through a network using a default application-based policy. In process block 304, a corresponding application-based policy is determined to use in forwarding the flow of packets through the network (e.g., after analyzing one or more packets using deep packet inspection). In process block 306, packets of the flow of packets are forwarded according to the identified application-based policy. In process block 308, packets of the flow of packets are monitored (and continued to be monitored while the flow of packets exists) by a monitoring point of a router through which the flow of packets is currently traversing (e.g., traveling through). These monitoring points are configured to avoid erred monitoring based on fluctuations in the path taken by the flow of packets (e.g., based on the duration of a gap in packets of the flow of packets in one embodiment). In process block 310, as required and based on policy-performance variance, the path taken by the flow of packets is updated while the flow of packets exists. Processing of the flow diagram of FIG. 3 is complete as indicated by process block 319.

Figure 4:
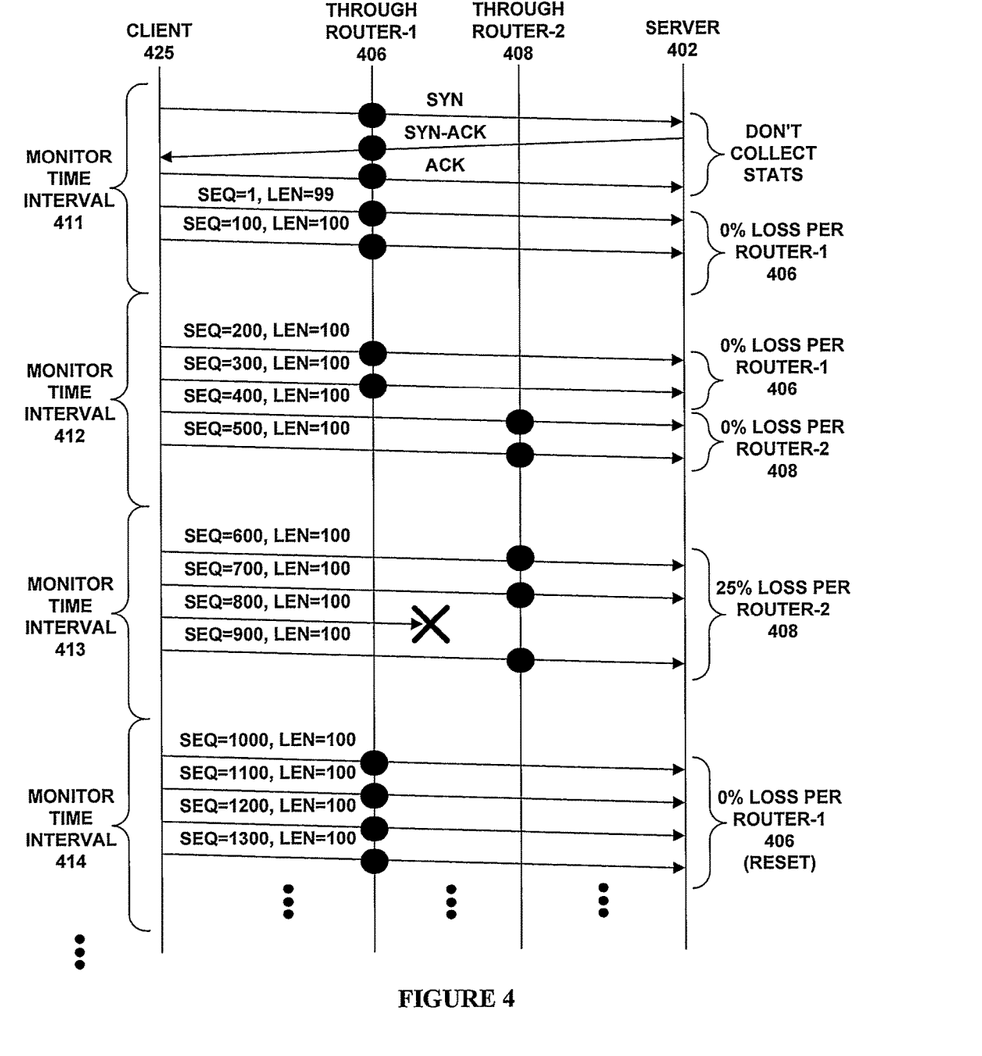
FIG. 4 illustrates a process according to one embodiment.

FIG. 4 illustrates a process according to one embodiment using a message sequence chart. Across the top are client 425, router 406, router 408, and server 402. In one embodiment, these respectfully correspond to client 125, router 106, router 108, and server 102 of FIG. 1. A black dot in FIG. 4 illustrates which one of routers 406 and 408 is traversed by the current packet of the flow of packets. Going from top to bottom and denoted on the left-side, shown are consecutive monitor time intervals 411, 412, 413 and 414. In one embodiment, a monitoring point monitors a packet flow for a monitor time interval and generates characteristics (e.g., network-delay, packet/byte loss, and jitter) of the packet flow. Going from top to bottom and denoted on the right-side are resultant loss percentages during the corresponding time interval 411-414 determined by router 406 and/or router 408.

In monitor time interval 411, a connection is established between client 425 and server 402 via router 406. In one embodiment, monitoring statistics are not collected on the initialization packets. In one embodiment, monitoring statistics are not collected until the application is identified (e.g., using deep packet inspection). As illustrated, router 406 determines a zero loss percentage in monitor time interval 411.

In monitor time interval 412, the path of the flow of packets changes to go through router 408, and each of routers 406 and 408 observe a zero loss.

In monitor time interval 413, one of the four packets of the flow of packets is dropped, and router 408 observes a twenty-five percent packet loss (e.g., based on sequence numbers of packets, with one of four packets not received within a monitor time interval which is less than the threshold time interval).

In monitor time interval 414, the path of packets of the flow of packets is through router 406 again and through the same monitoring point. This monitoring point detects the gap in packets, both in terms of sequence numbers and time. The last packet of the flow received by router 406 before the gap (e.g., caused by the switching of paths) has a sequence number of 300, and the first packet after the gap has a sequence number of 1000. In one embodiment, the threshold time duration for differentiating between a gap attributed as being caused by dropped packets and attributed as not being caused by dropped packets is the duration of a monitor time interval (or at least a monitor time interval in one embodiment). Because the time of the gap is greater than the threshold time amount, the monitoring point of router 406 will attribute the gap as not being caused by dropped packets, reset its monitoring metrics, and determine a loss of zero.

Figure 5A:
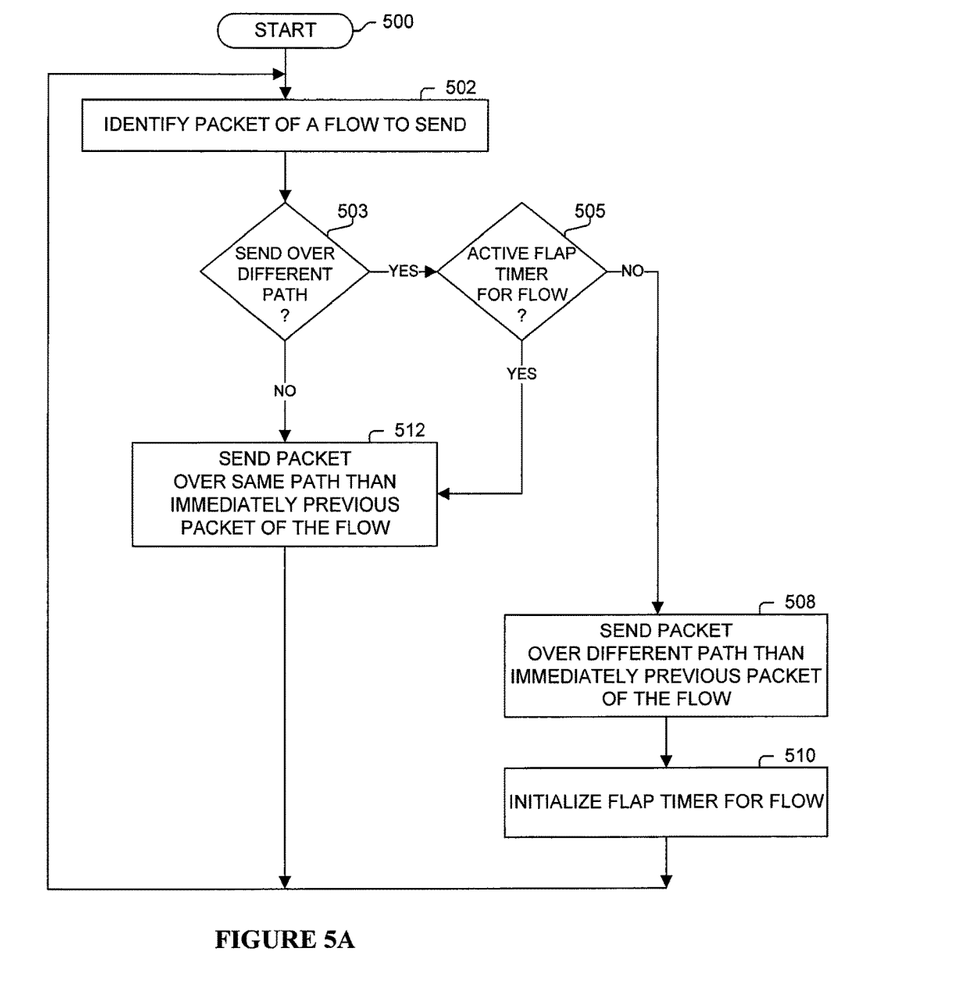
FIG. 5A illustrates a process according to one embodiment.

FIG. 5A illustrates a process performed in one embodiment by a packet switching device. Processing commences with process block 500. In process block 502, a packet of a flow of packets is identified for sending from a router (e.g., a packet that is traversing the router). In process block 503, a determination is made whether to send over a same path as the previous packet of the flow of packets or over a different path (e.g., due to policy-based routing, network congestion, etc.). If the determination in process block 503 is to send over a different path, then processing proceeds to process block 505, else to process block 512. In process block 505, a determination is made whether there is an active flap timer for the flow of packets to prevent returning to a previous path/monitoring point until it is guaranteed that the duration of the gap packets observed at the monitoring point will be greater than the attributing-cause threshold. If there is an active timer, then processing proceeds to process block 512, else processing proceeds to process block 508.

Based on the determination(s) of process block 503 or process blocks 503 and 505 if processing is to proceed to process block 512, then the packet is sent over the same path as the previous sent packet of the packet flow and processing returns to process block 502.

Based on the determinations of process blocks 503 and 505 that processing is to proceed to process block 508 (as there is no active timer as the previous timer for the flow of packets has expired), then the packet is sent over a different path than the previous sent packet of the packet flow. In process block 510, a flap timer for the flow of packets is started (and which will expire in time to become not active) to prevent the flow of packets returning to a previous monitoring point and causing a gap in the flow of packets with a duration less than the attributing-cause threshold (e.g., defining whether to attribute the gap to dropped packets or not due to dropped packets). In one embodiment, the flap timer is kept for a tuple of flow of packets and path, with the determination of process block 505 being whether there is an active timer for the flow of packets and the different path. Processing of the flow diagram of FIG. 5A returns to process block 502.

Figure 5B:
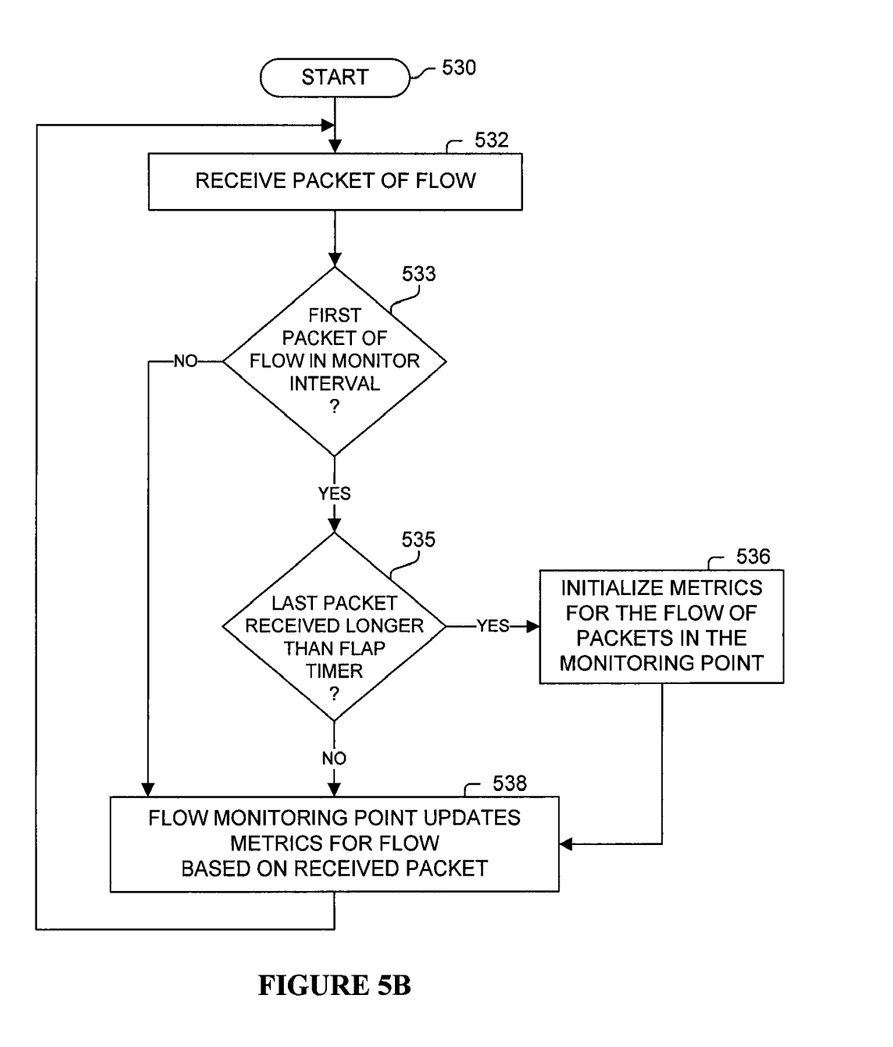
FIG. 5B illustrates a process according to one embodiment.

FIG. 5B illustrates a process performed in one embodiment by a packet switching device. Processing by commences with process block 530. In process block 532, a packet of a flow of packets is received. As determined in process block 533, if this packet is the first packet of the flow of packets received in the current monitor interval, then processing proceeds to process block 535 to evaluate a gap if present (as the attributing-cause threshold is at least the duration of a monitor interval in one embodiment); else processing proceeds directly to process block 538. As determined in process block 535, if the duration of the time from receiving the prior packet of the flow of packets is longer than the flap timer (i.e., attributing-cause threshold to attribute a gap to dropped packets or not due to dropped packets), then in process block 536 the metrics of the monitoring point are reset as the gap is attributed to not being caused by dropped packets and processing proceeds to process block 538; otherwise processing proceeds directly to process block 538. In process block 538, the flow monitoring point updates metrics on the flow of packets based on the received packet. Processing of the flow diagram of FIG. 5B returns to process block 532.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:

communicating packets of a flow of packets from a first network node to a second network node through a source intermediate packet switching device in a network, with the network including a first path between the source intermediate packet switching device and the second network node through a first intermediate packet switching device but not through a second intermediate packet switching device, with the network including a second path between the source intermediate packet switching device and the second network node through the second intermediate packet switching device but not through the first intermediate packet switching device; and monitoring and evaluating, by the first intermediate packet switching device, received packets of the flow of packets received by the first intermediate packet switching device in determining whether one or more packets of the flow of packet has been dropped by said communicating said packets of the flow of packets;

wherein said communicating the flow of packets from the first network node to the second network node includes:

forwarding, by the first intermediate packet switching device towards the second network node, said received packets of the flow of packets;

forwarding, by the source intermediate packet switching device, a first plurality of packets of the flow of packets over the first path;

subsequent to said forwarding the first plurality of packets, the source intermediate packet switching device switching from forwarding of packets of the flow of packets over the first path to using the second path that includes forwarding a second plurality of packets of the flow of packets over the second path; and subsequent to said sending the second plurality of packets, the source intermediate packet switching device switching from forwarding of packets of the flow of packets over the second path to using the first path that includes forwarding a third plurality of packets of the flow of packets over the first path;

wherein said monitoring and evaluating of said received packets of the flow of packets received by the first intermediate packet switching device includes the first intermediate packet switching device detecting a gap in consecutive packets of the flow of packets, and updating performance metrics including attributing the gap as not being dropped one or more packets of the packet flow based on a particular time duration between receiving a packet of first plurality of packets and receiving a packet of third plurality of packets being greater than a predetermined threshold time duration.

2. The method of claim 1, wherein said communicating the flow of packets from the first network node to the second network node includes the source intermediate packet switching device performing operations, including: in response to a determination to forward packets of the flow of packets over the first path and a determination that said switching from forwarding of packets of the flow of packets over the first path to using the second path occurred less than the threshold time duration, the source intermediate packet switching device delaying until at least the threshold time duration after said forwarding the first plurality of packets over the first path and after said delaying, said switching from forwarding of packets of the flow of packets over the second path to using the first path that includes forwarding a third plurality of packets of the flow of packets over the first path to signal to the first intermediate packet switching device that the path taken by packets of the flow of packets was temporarily changed to a different path through the network.

3. The method of claim 1, wherein said monitoring and evaluating includes detecting a second gap in consecutive packets of the flow of packets and attributing the second gap as being dropped one or more packets based on a second particular time duration between a last received packet in the flow of packets before the second gap and a first received packet in the flow of packets after the second gap being less than the predetermined threshold time duration.

4. The method of claim 1, wherein switching from said sending the first plurality of packets over the first path to said sending the second plurality of packets over the second path is performed in response to a determination of a policy of policy-based routing.

5. The method of claim 4, including deep packet inspection of one or more packets in the first plurality of packets to identify the policy of said policy-based routing.

6. The method of claim 1, wherein said updating performance metrics includes resetting said performance metrics.

7. The method of claim 1, where the predetermined threshold time duration is at least thirty seconds.

8. A packet switching device, comprising:

one or more processing elements;

memory;

a plurality of interfaces that send and receive packets; and one or more packet switching mechanisms that packet switch packets among said interfaces;

wherein the packet switching device is and intermediate packet switching device on a first path of a plurality of different paths between a first network node and a second network node in a network, with at least one of the plurality of paths not including the packet switching device; and wherein the packet switching device performs operations that include:

forwarding received packets of the flow of packets into the network on the first path towards the second network node; and monitoring and evaluating said received packets of the flow of packets in determining whether one or more packets of the flow of packet has been dropped in the network;

wherein said monitoring and evaluating said received packets of the flow of packets includes detecting a gap in consecutive packets of the flow of packets, and updating performance metrics including attributing the gap as not being dropped one or more packets based on a particular time duration between a last received packet of the flow of packets before said detected gap and a first received packet of the flow of packets after said detected gap being greater than a predetermined threshold time duration.

9. The packet switching device of claim 8, wherein said monitoring includes resetting said performance metrics for the flow of packets in response to said attributing the gap as not being dropped one or more packets.

\* \* \* \* \*

UNITED STATES PATENT AND TRADEMARK OFFICE
CERTIFICATE OF CORRECTION

PATENT NO. : 10,389,615 B2  
APPLICATION NO. : 14/753325  
DATED : August 20, 2019  
INVENTOR(S) : Shen et al.

Page 1 of 1

It is certified that error appears in the above-identified patent and that said Letters Patent is hereby corrected as shown below:

In the Specification

Column 6, Line 47:
"is less than a considered"
Should be:
-- is less than a predetermined threshold value (e.g., typically the same threshold value), then the gap is considered --

Signed and Sealed this
Nineteenth Day of November, 2019

Andrei Iancu
*Director of the United States Patent and Trademark Office*